United States Patent [19]

Porter et al.

[11] Patent Number: 5,568,843
[45] Date of Patent: Oct. 29, 1996

[54] PRECISION LINEAR MECHANICAL LOCK

[75] Inventors: Clyde R. Porter, Los Angeles; Calvin R. Stringer, Saugus, both of Calif.

[73] Assignee: P. L. Porter Co., Woodland Hills, Calif.

[21] Appl. No.: 558,201

[22] Filed: Nov. 16, 1995

Related U.S. Application Data

[63] Continuation of Ser. No. 446,384, May 22, 1995, abandoned, which is a continuation of Ser. No. 74,041, Jun. 8, 1993, abandoned.

[51] Int. Cl.$^6$ ................................................ B65H 59/10
[52] U.S. Cl. ........................... 188/67; 74/531; 248/410; 297/375
[58] Field of Search ..................... 188/67, 265; 74/531; 248/354.1, 354.4, 354.5, 410, 414; 267/154, 155; 297/374, 375

[56] References Cited

U.S. PATENT DOCUMENTS

| | | | |
|---|---|---|---|
| 3,874,480 | 4/1975 | Porter et al. | 188/67 |
| 3,893,730 | 7/1975 | Homier et al. | 188/67 |
| 4,387,926 | 6/1983 | Van Eerden et al. | 188/67 |
| 4,411,339 | 10/1983 | Porter | 188/67 |
| 4,425,987 | 1/1984 | Porter | 188/67 |
| 4,457,406 | 7/1984 | Porter | 188/67 |
| 4,577,730 | 3/1986 | Porter | 297/375 |
| 5,150,771 | 9/1992 | Porter | 188/67 |
| 5,219,045 | 6/1993 | Porter et al. | 188/67 |

FOREIGN PATENT DOCUMENTS 1034644  6/1966  United Kingdom ............... 248/354.1

*Primary Examiner*—Mark T. Le
*Assistant Examiner*—Chris Schwartz
*Attorney, Agent, or Firm*—Beehler & Pavitt

[57] ABSTRACT

A mechanical lock of the type where a rod is normally locked for axial movement through a lock housing by a spring tightly wound about the rod and axially fixed to the housing, the rod being released by partially unwinding the spring. The lock is assembled without welding of the components to permit use of dissimilar materials in the lock housing selected for strength and weight characteristics and use of plated or painted components. The lock housing is configured to reduce the number of parts in the lock and adjustment can be made to eliminate axial free play of the locking spring following assembly of the lock housing.

37 Claims, 3 Drawing Sheets

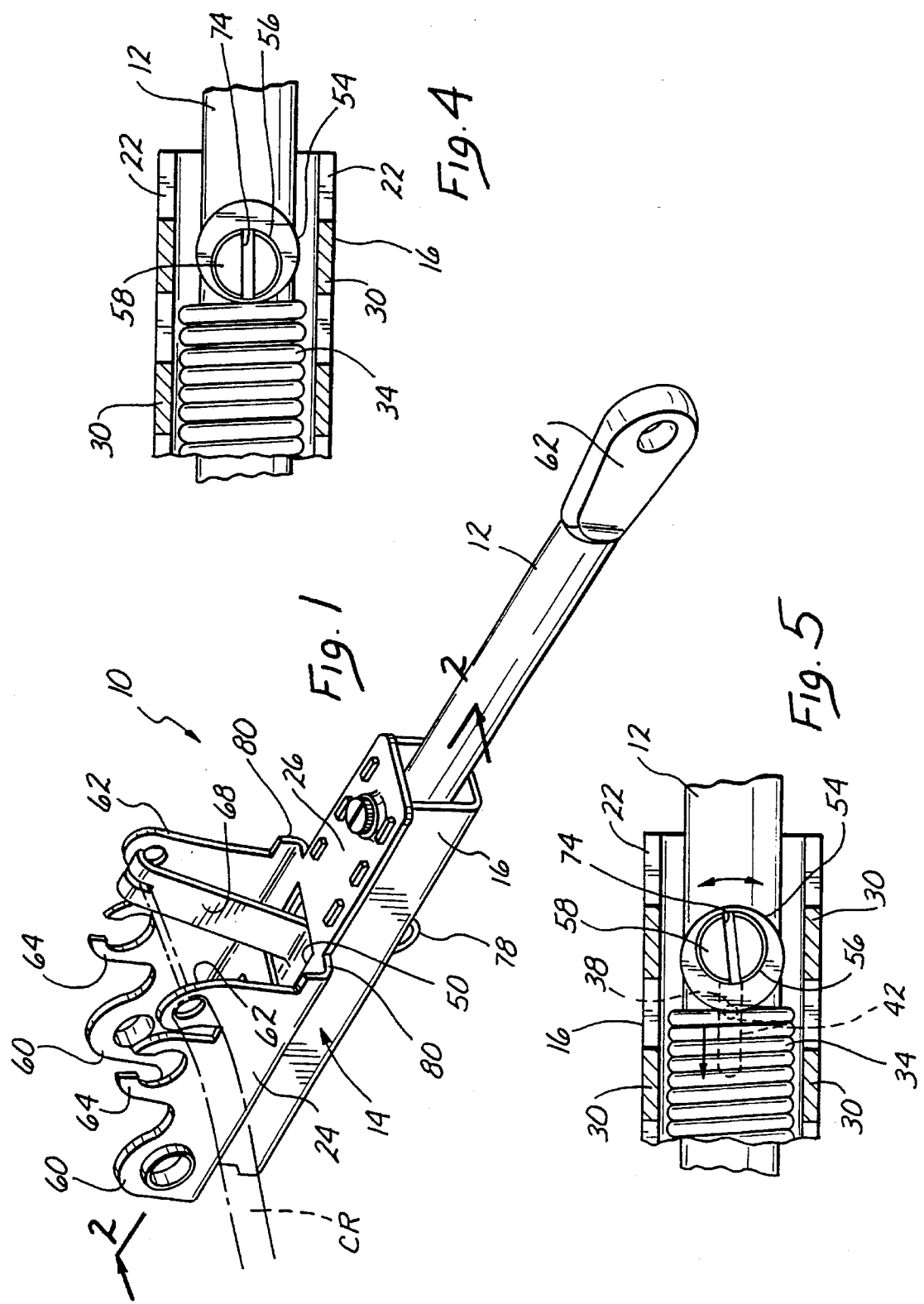

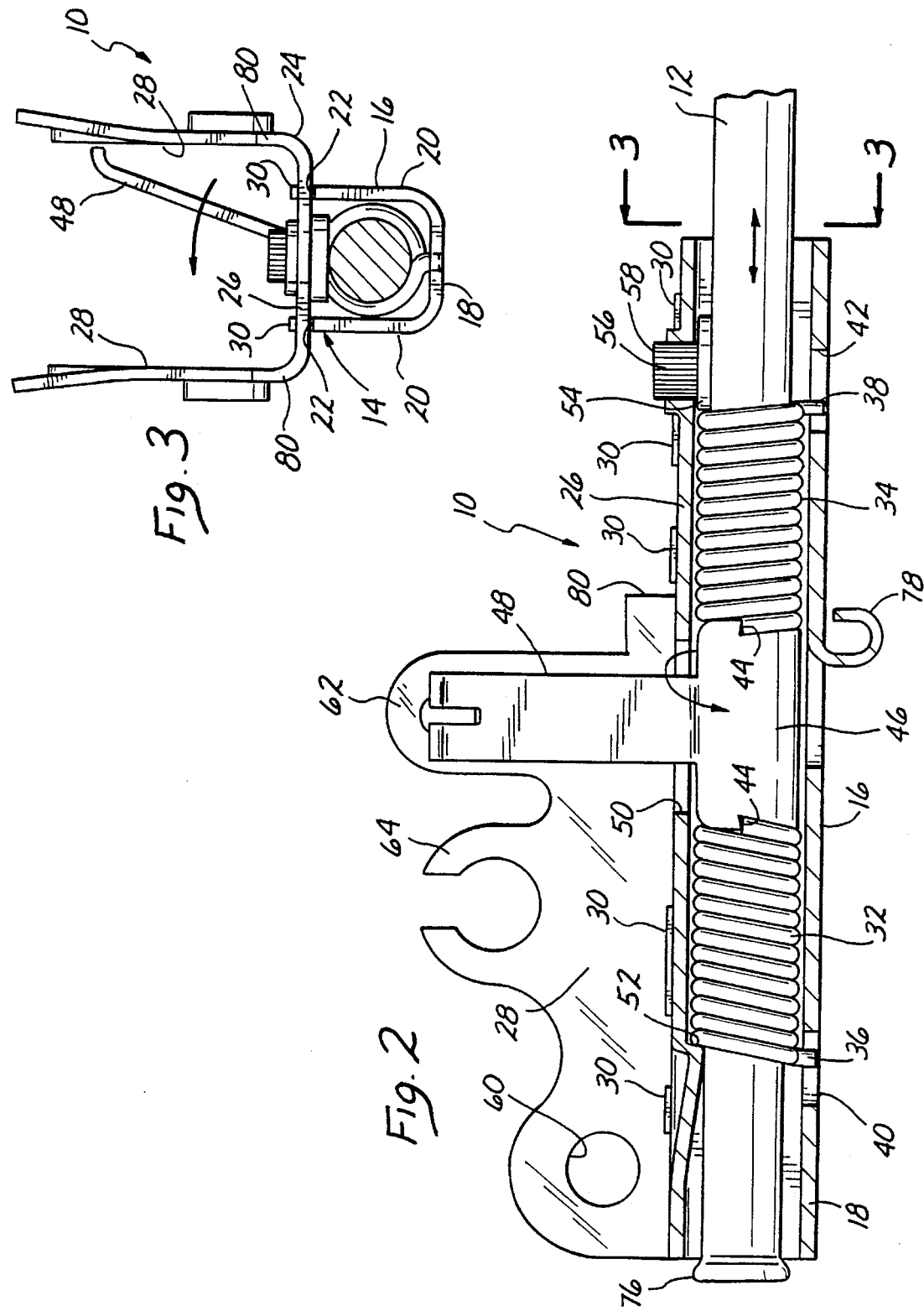

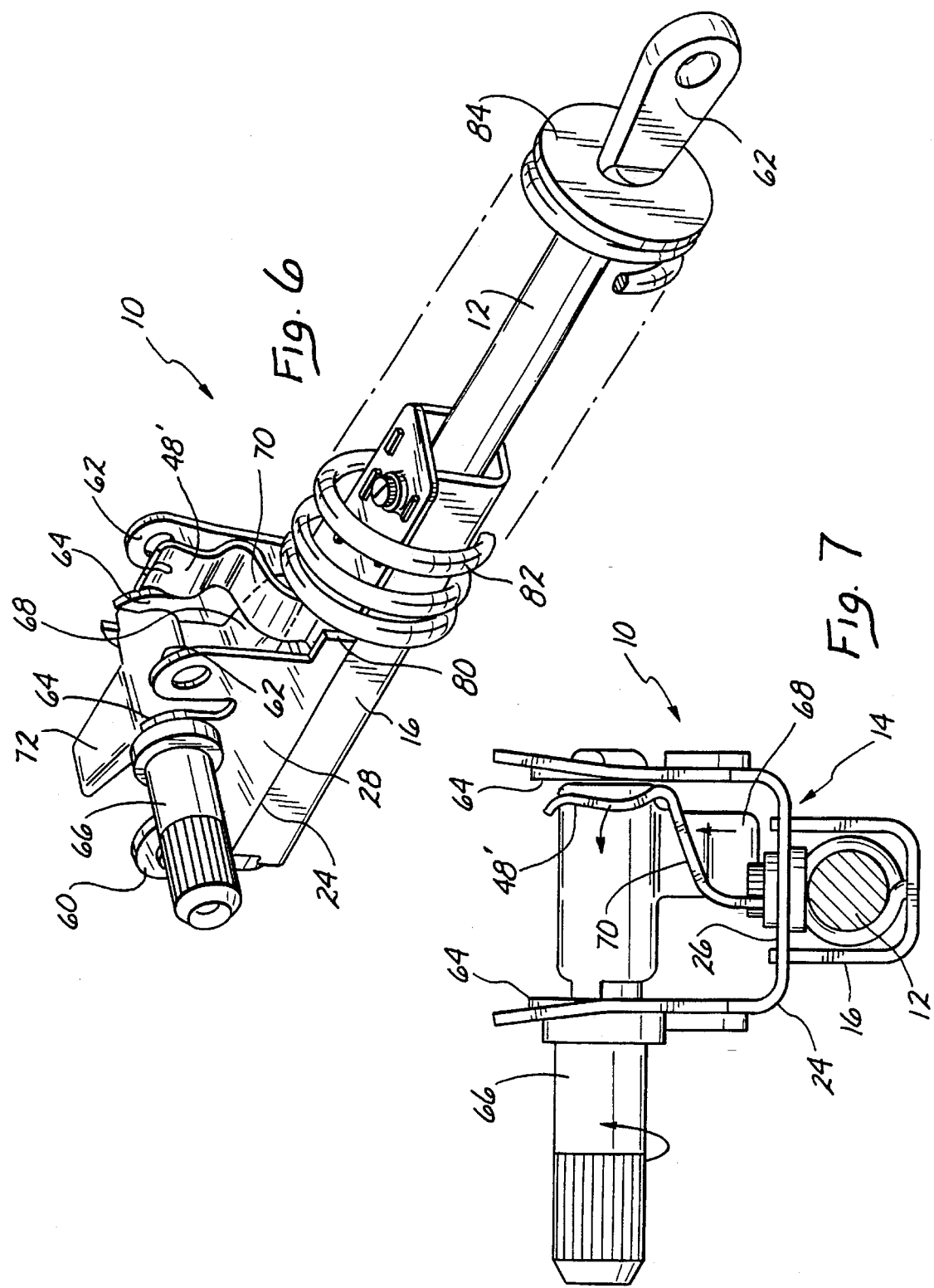

PRECISION LINEAR MECHANICAL LOCK

This application is a continuation of application Ser. No. 08/446,384, filed May 22, 1995, now abandoned, which is a continuation of Ser. No. 08/074,041, filed Jun. 8, 1993, now abandoned.

BACKGROUND OF THE INVENTION

1. Field of the Invention

This invention pertains generally to the field of mechanical locking devices of the type having a rod normally locked against axial movement through a lock housing by a clutch spring of reduced diameter, where the rod is released by partially unwinding the spring.

2. State of the Prior Art

The device of this invention pertains to a class of mechanical locks which generally have a rod axially movable through a lock housing, one or more coil springs tightly wound about the rod and axially fixed to the housing so as to normally grip the rod against movement through the housing. A release is provided for partially unwinding the coil spring or springs such that the internal diameter of the spring is increased and the rod is released for axial movement relative to the lock housing. Linear locks of this type have been in widespread use, particularly in recliner seats used in automobiles and other vehicles. In such installations, the housing of the mechanical lock is attached to one of the reclinable backrest or the stationary seat, while the end of the rod is connected to the other of those two seat components. In its normally locked condition the device fixes the position of the backrest. If the occupant desires to reposition the backrest, the lock is manually released, which frees the rod and allows movement of the backrest. The mechanical lock typically has a heavier exterior coil spring which returns the rod to an extended condition when the lock is released. For example, the spring may serve to bring the seat backrest to a fully upright condition. One relatively early example of such a lock is disclosed in U.S. Pat. No. 3,874,480 issued to Porter et al. and owned by the Assignee of this patent application.

In applications where bi-directional loading of the rod is anticipated, two springs may be provided, one on each side of a common release lever and axially contained between two end bushings, each bushing engaging an end tang of a corresponding spring to fix the tang and the outer end coils of the spring against rotation about the rod. The inner end coils of the springs are connected to a release lever, actuatable for simultaneously unwinding both springs to free the rod for axial movement through the housing.

The bushings serve three distinct functions. An axial bore in each bushing defines a radial bearing surface which supports the rod for sliding movement through the lock housing. A radial slot in the bushing receives an end tang of the spring, to circumferentially fix the outer end of the spring and prevent this end of the spring from turning about the rod. Finally, an axial bearing surface on the bushing is circumferentially spaced by 90 degrees from the spring tang. When the spring is pulled with the rod against the axial bearing surface by a load acting on the rod relative to the lock housing, the end coils of the spring are canted relative to the rod axis. This canting deforms the coils from a normal circular shape to an ellipsoid shape, and substantially increases the frictional engagement between the spring coils and the rod. The clutch spring better resists the load and makes for a more positive lock of the rod relative to the housing so long as the loading condition persists.

Prior art locks also feature a tubular sleeve which closely envelops the spring or springs, to prevent the coils from unwinding preferentially at the release lever while the coils at the opposite end remain in a rod gripping condition. The sleeve prevents this result by distributing the unwinding action more evenly along the length of the spring so that all coils release the rod at substantially the same time, for positive, quick release action of the lock.

Early locks of this type were housed in a cylindrical tube open at one or both ends. The clutch spring was mounted on the rod, and other components such as end bushings, actuator levers, etc. all were assembled onto the rod and then inserted into the housing. The housing wall was then swaged or welded to hold the internal components in axially fixed position within the housing. The relative positions of the lock elements in the housing is rather critical and a high degree of precision must be maintained in assembling the lock. A tube type housing makes this objective difficult to achieve with consistency.

More recently, the tube style housing has evolved into a two-piece clam shell housing, described in European patent application number 85201888.6 filed Nov. 18, 1985, Publication number 0 182 440 83. An envelope or housing is formed by two half-shells. The rod is first fitted with the two coil springs, a release lever including a containment sleeve about the springs, and a pair of end bushings which engage the ends of the coil spring. The half-shells are mated to each other with the rod assembly in-between, and welded to the bushings to form an enclosure about the rod. The axial spacing between the bushings is fixed by this welding, with springs axially contained between the bushings. The rod slides through the bushings and the housing when the spring is unwound to permit such movement.

The need to weld bushings to a lock housing has been a source of difficulty in prior art locks. In practice, it is very difficult to produce locks with welded bushings which are perfectly aligned with the rod axis, and such misalignment introduces a degree of frictional drag into the lock mechanism. In addition, the bushings add significantly to the cost of the lock, and may have to be differentially hardened to provide hard bearing surfaces as well as untreated portions which can be welded.

U.S. Pat. No. 5,157,826, commonly owned with this application, describes a method for making a linear mechanical lock in which the number of component parts is reduced by fabricating the lock housing from a single sheet of metal and embossing various elements, which previously constituted separate parts, into the single sheet. In particular, the interior dimension of the housing is such as to closely encompass the clutch springs to promote even unwinding of the spring along its length upon actuation of the lock release without a separate containment sleeve. While this prior invention represents a substantial contribution to the state of art, further improvements have been made which facilitate fabrication and assembly of the linear lock while at the same time improving the precision of the lock assembly for smoother, easier and faster lock operation.

SUMMARY OF THE INVENTION

The mechanical lock of this invention has two housing elements which are assembled to make up a tubular lock housing. Two coil springs are wound coaxially on a rod extending through the housing. The springs are axially contained between two opposite axial bearings provided on only one of the housing elements, and the springs have a normal inside coil diameter sized for clutching the rod against axial movement through the housing. The springs have inner ends connected to a release and outer ends with tangs circumferentially fixed to the other of the two housing elements. The release may take the form of a release lever rotatable about the rod between the springs so as to simultaneously partially unwind the end coils of both springs to an enlarged inner diameter. The housing is internally sized to closely encompass the spring between the axial bearings so as to limit the enlarged diameter of the end coils and transmit the slack caused by the unwinding at one end of the coil spring along the length of the spring, thereby to achieve fast and positive release of the rod in response to actuation of the release.

One or both of the axial bearings are adjustable for reducing free play of the spring along the rod. The adjustable axial bearing may be a rotatable eccentric cam which engages an outer end coil of the spring, and can be manually turned to urge the spring coils against an opposite axial bearing to remove free play along the spring and ensure good positive contact of the spring at both ends with the respective axial bearings. The eccentric cam may be on the inner end of a rotatable plug fitted in an opening in the lock housing, the exterior end of the plug being slotted and externally accessible by bladed tool, such as a screwdriver for turning the plug. Following adjustment, the end bearing element may be fixed in position by adhesive bonding to the lock housing.

The linear lock is normally installed between two load elements which are movable relative to each other. This installation is by first and second load connectors on the housing and the rod respectively. The housing load connector is provided only on one of the housing elements, which is the same housing element which carries the axial bearings. The other housing element is not directly connected to the load and only holds the spring tangs against turning. One of the housing elements is therefore a load bearing element which carries most or nearly all of the working load of the lock, and the second, non-load bearing housing element is relatively lightly loaded. This novel arrangement makes it possible to use lighter materials for the second housing element, thereby realizing significant savings in the overall weight of the lock. Further, since heavy loads need not be shared by the housing elements they can be fastened together by purely mechanical means without resort to welding, allowing a wider choice of materials for the housing elements since compatibility with welding processes is no longer required.

In a presently preferred form of the invention, the non-load bearing housing element is a length of U-shaped channel stock of U-shaped cross section with a bottom between two sides and one open side. Openings in the bottom receive and hold the end tangs of the clutch spring in a circumferential direction relative to the lock housing. The load bearing housing element has a base plate which is attached to the channel and closes the open side of the channel to form a tubular enclosure of generally rectangular interior cross section about the rod and the clutch springs. When the release is actuated to enlarge the clutch spring diameter and release the rod the outer circumference of the clutch springs contacts all four sides of the housing. The spacing between the interior surfaces of the housing, and the outer diameter of the clutch spring in the normal condition of the lock, is small so that the outer diameter of the clutch spring is limited upon unwinding and the slack induced by the release is quickly transmitted along the length of the spring for fast release of the rod.

The load bearing housing element preferably has a mounting for a release actuator, such as a manually operated handle which upon turning actuates the release of the lock, or a cable release for remote actuation of the lock release. The mounting may be integral with the housing element and also integral with the load connector on the same housing element.

A presently preferred manner of assembling the housing elements is by tabs on the longitudinal edges of the channel element along the open side. The tabs mate into aligned slots in the load bearing housing elements, and are bent to make a simple mechanical interlock to secure the two housing elements to each other.

These and other improvements, features and advantages of this invention will be better understood by reference to the following detailed description of the preferred embodiments and the accompanying drawings.

BRIEF DESCRIPTION OF THE DRAWINGS

FIG. 1 is a perspective view of a linear mechanical lock according to this invention, equipped with a remote cable release which is shown in phantom lining;

FIG. 2 is a longitudinal section of the lock taken along line 2—2 in FIG. 1;

FIG. 3 is a cross sectional view taken along line 3—3 in FIG. 2;

FIG. 4 is a top view taken partly in section to expose the adjustable eccentric cam at one end of the clutch spring, the cam being shown at minimum engagement with the spring prior to adjustment;

FIG. 5 is a view as in FIG. 4 with the eccentric cam adjusted to take up axial play in the clutch spring;

FIG. 6 is a perspective view as in FIG. 1 with the lock equipped for installation of a manual handle release in lieu of the remote cable release shown in phantom lining in FIG. 1;

FIG. 7 is an end view partly in section along line 7—7 in FIG. 6.

DETAILED DESCRIPTION OF THE PREFERRED EMBODIMENTS

With reference to the drawings, the linear mechanical lock of this invention, generally designated by the numeral 10, has a cylindrical rod 12 which extends into a tubular lock housing 14. The lock housing 14 has a bottom, non-load bearing element 16, and a top, load bearing element 24. The two housing elements 16, 24 are assembled to make a tubular housing which is open at opposite ends. The bottom part 16 is a length of channel stock which, as seen in the cross sectional view of FIG. 3, has a bottom 18, two sides 20, and an open side between upper edges 22 as shown in FIG. 3. The top part 24 is also U-shaped in cross section with a base 26 between side portions 28. Tabs 30 along the upper edges 22 of the channel 16 mate into aligned slots in the base 26 of the top housing element, and are bent so as to mechanically interlock the channel 16 to the underside of the base plate 26, closing the open side of the channel 16. The resultant housing assembly 14 has a nearly rectangular interior cross section, as seen in FIG. 3.

A pair of clutch springs 32, 34 are wound axially about the rod 12 in opposite senses to each other and have a normal internal diameter slightly smaller than the rod diameter, so that both springs grip the rod tightly. The outer ends of the clutch springs 32, 34 terminate in tangs 36, 38, respectively. The tangs are circumferentially fixed relative to the housing 14 in slots 40, 42 defined in the bottom 18 of the channel 16. The inner ends of the clutch springs 32, 34 are engaged in notches 44 of a sleeve 46 which is coaxial with and rotatable about the rod 12 by means of release lever 48. The lever 48 extends through a window 50 in the base plate 26 and is urged against one of the side portions 28 by the tension of springs 32, 34 acting on the sleeve 46.

The clutch springs 32, 34 are axially contained between opposite axial bearings. One axial bearing is a fixed shoulder 52 integral with the base plate 26. The other axial bearing is an eccentric cam 54 fixed to the inner end of a plug 56 which is rotatable in an opening 58 in the base plate 26, as shown in FIG. 2. The axial bearings 52, 54 engage the outer end coil of a corresponding clutch spring 32, 38 at a point diametrically opposite to the end tangs 36, 38. FIG. 4 shows the adjustable axial bearing in plan view with the base plate 26 removed for clarity. The outer end 58 of plug 56 has a slot 74 engageable by a bladed tool, such as a screwdriver, for turning the plug 56 in hole 58. Rotation of the plug 56 turns the eccentric cam between a minimum radius engagement with the end coil of clutch spring 34, shown in FIG. 4, and a maximum radius engagement, seen in FIG. 5, along the circumference of the cam 54.

In a normal condition of the linear lock 10, the clutch springs 32, 34 lock the rod 12 against axial movement through the housing 14. The rod 12 is released for axial movement by turning release lever 48 and sleeve 46 counterclockwise as indicated by the arrow in FIGS. 2 and 3. The sleeve 46 simultaneously turns the inner ends of both clutch springs in a sense which unwinds the spring coils, enlarging their inner diameter. The interior dimensions of the lock housing, between the inner surfaces of the sides 20, and between the bottom 18 and base plate 26, are only slightly greater than the normal outside diameter of springs 32, 34, so that the housing 14 closely encompasses the clutch springs. As release lever 48 begins to turn, the inner end coils of the two springs unwind and their outer diameter enlarges only slightly before their expansion is limited by contact with the interior surfaces of the channel 16 and the base plate 26. Continuing movement of release lever 48 is transmitted to successively adjacent coils from the outer ends of the springs towards the inner end coils as the expansion of each successive coil is limited by the closely adjacent interior surfaces of the lock housing 14, ultimately resulting in the enlargement of all the coils of both springs, releasing the rod 12 for axial movement through the housing 14.

The upright side portions 28 of the housing top 24 are shaped and perforated to provide two mounting lugs 60 which together constitute a first load attachment point for the lock 10. A second load attachment point is provided by a perforated mounting lug 62 at the end of rod 12. * The lugs 60 on the housing are close to the base 26 of the housing top 24 so as to place the load vector connecting the two load attachment points into near alignment with the rod 12. The working loads on the lock 10, whether tension or compression loads, are transmitted from one load component to the lugs 60 on the housing, through the axial bearings 52, 54 to the clutch springs which act axially on the rod 12 and ultimately to the other load component connected to the rod end. The approximate alignment of the load vector with the rod and spring axis minimizes load transfer from the top housing element 24 to the bottom housing element 16. The working loads of the lock 10 are therefore primarily carried by the top housing element 24. Since the attachment lugs 60 are not quite on-axis with the rod, some lateral loading of the housing 14 relative to the rod 12 and springs 32, 34 may occur, in which case some fraction of the total working load will be transmitted to the housing bottom 16. The loads on the channel 16, however, will be small as compared to the loading on the housing top 24. For this reason, the housing top 24 may be properly considered to be the load bearing element of the housing, while the housing bottom or channel 16** is referred to as the non-load bearing element of the housing.

In a preferred form of this invention the rod 12 is supported in the housing 14 only by the clutch springs 32, 34, obviating the rod bearing surfaces provided by bushings in prior art linear locks. In many applications, the clutch springs will suffice to support the rod in axial alignment through the lock housing, particularly if the load attachment to the housing is made close to the rod axis, so that the loading on the lock mechanism is as nearly as possible aligned with the axis of the rod, and the axial load is largely taken up by the axial bearing elements 52, 54. While some torsional or lateral loading on the housing 14 relative to the rod 12 may still occur, such loading is adequately carried by the clutch springs without unduly affecting the operation of the lock. Where particularly heavy working loads are to be carried by the lock 10, rod bearing surfaces may be provided integrally with one or both of the housing elements 16, 24, near one or both ends of the housing 14, by for example embossing or otherwise deforming inwardly the housing elements at selected points.

Because of the large difference in load bearing requirements, the housing top 24 can be made of high strength material such as steel, while the channel 16 can be of lighter, lesser strength material such as aluminum. The possibility of using different housing materials in this manner permits significant reductions in the overall weight of the lock 10. This is an important consideration in vehicular installations, such as automotive and aircraft seating, which are typical applications for these linear locks. Both housing elements 16, 24 can be fabricated of sheet stock at low cost by stamping methods.

Yet another important advantage of this lock housing structure is that the housing elements 16, 24 can be fastened together by simple mechanical means without resort to welding, which in turn permits a wider choice of materials for the housing elements since compatibility with welding processes is no longer required. The load bearing capacity of the integral fixed axial bearing 52 may be enhanced by heat treatment of the housing top 24 for greater hardness. The mechanical interlock between the housing components 16, 24 allows such hardening, since welding of the two components is unnecessary.

Additionally, the housing components of the lock of this invention can be coated by various processes for corrosion resistance where the lock 10 is to be used in environmentally adverse conditions, as sell as for improved esthetic appearance for greater customer acceptance. The coating may be by various plating and painting processes, which were impractical in prior art mechanical locks requiring welding, since plated or painted components cannot be easily welded and post-assembly plating or painting is impractical.

The upright sides 28 also have mounting lugs 62 for optional left or right side mounting of a cable release CR, shown in phantom lining in FIG. 1, for remote actuation of the release lever 48. The cable release is conventional, and has a sleeve which in anchored at its end to one of the mounting lugs 62, and a cable slidable within the sleeve which is attached to the outer end of the release lever 48. Pulling on the cable relative to the sleeve at a remote end of the cable release CR actuates the lever 48 for unwinding the clutch springs 32, 34 and freeing the rod 12 for axial movement through the lock housing.

The upright sides 28 further have alternate release mountings 64 for optional right or left hand side mounting of a handle release actuator shown in FIGS. 6 and 7, where the release lever 48' has a modified, curved shape, best shown in FIG. 7. A handle mounting shaft 66 is supported between the two mountings 64. An actuator finger 68 extends generally radially from the shaft 66. Turning the shaft 66 as indicated by the arrow in FIG. 7, causes the release finger 68 to lift a transverse intermediate portion 70 lifting and turning the release lever 48 towards the left in FIG. 7 as indicated by the arrows. The inner end of the modified release lever 48' is attached to a sleeve 46, as shown in FIG. 2. A stop finger 72 is fixed radially to the shaft 66 and is generally diametrically opposite to the release finger 70. The stop finger moves downwardly as the release finger 68 moves up against the release lever 48' until the stop finger 72 comes against the base plate 26, stopping further rotation of the shaft 66, to prevent excessive force against the release lever 48'.

Assembly of the mechanical lock 10 is simple and quick. The clutch springs and the sleeve 46 of the release lever 48 are fitted onto a rod blank which is then worked to make either or both the end lug 62 and an upset 76 at the opposite end of the rod of sufficient diameter to serve as a stop against withdrawal of the rod from the housing 14. This subassembly is then placed into the channel 16, with the end tangs 36, 38 in their corresponding slots 40, 42 in the bottom of the channel. The housing top 24 is then mated to the tabs 30 of the channel 16, so that the clutch springs 32, 34 lie axially between the axial bearings 52, 54. The two housing elements 16, 24 are then fastened together by staking the tabs 30 on the upper side of the base 26. At this point in the assembly sequence a degree of axial slack or free play between adjacent coils of the clutch springs will typically exist, as illustrated by the slight spacing between the end coils of the spring 34 in FIG. 4. This free play is removed by adjustment of the axial bearing 54, accomplished by turning the plug 56. Rotation of the cam 54 with the plug 56 continuously varies the axial position of the contact point between the eccentric camming edge of the cam 54 and the end coil of the clutch spring 44. By turning the cam 54 between the minimum engagement position of FIG. 4 and the maximum engagement position of FIG. 6, a cam position will be found where the coils of both clutch springs 32, 34 are closely adjacent without free play in an axial direction, yet without excessive tightness or friction between the coils which would impede response to the release lever 48. Adjustment of the cam 54 operates to urge the coils of the clutch spring 34 towards the opposite axial bearing 52. During this adjustment procedure, the sleeve 46 of the release lever is free to move axially on the rod 12 under the urging of the cam 54 transmitted through the clutch spring 34. Once the cam 54 is adjusted, the plug 56 is fixed against subsequent rotation by application of a suitable permanent adhesive between the plug and surrounding portions of the lock housing. Where particularly heavy working loads are anticipated, greater than can be satisfactorily carried by the fixed bearing shoulder 52, the mechanical lock 10 can be modified by replacing the fixed axial bearing 52 with a second adjustable axial bearing similar to the plug 56 with eccentric cam 54.

In some applications, it may be desirable to provide a relative large external spring 82 compressed between the lock housing 14 and the rod 12, as shown in FIG. 6, to continuously bias the rod 12 to an extended position relative to the lock housing. For that purpose, a spring stop 78 is formed by curling a strip cut from the bottom 18 of the channel 16, as shown in FIG. 2. The spring stop 78 is axially aligned with edges 80, which cooperate with the spring stop 78 in supporting the inner end of the external coil spring 82. The opposite, outer end of the coil spring 82 is supported by a stop element 84 on the rod 12.

While a presently preferred form of the invention has been described and illustrated for purposes of clarity and example only, it will be better understood that many changes, substitutions and modifications to the described embodiments will become readily apparent to those possessed of ordinary skill in the art without thereby departing from the scope and spirit of the present invention which is defined in the following claims.

What is claimed is:

1. A mechanical lock comprising:
   a channel shaped first housing element having opposite open ends and a side opening extending between said open ends, a rod axially movable between said open ends in said first housing element, two coils springs wound on said rod, a second housing element secured to said first housing element for closing said side opening, said first and second housing elements together defining a tubular housing open at opposite ends, said springs axially contained between axial bearing means supported only on said second housing element, said springs having a normal inside diameter for locking said rod against movement through said housing, said springs having opposite ends and end tangs at said opposite ends, said tangs circumferentially fixed in openings defined in one of said housing elements, and release means engaged to inner ends of said springs for simultaneously unwinding said springs thereby to free said rod for movement through said housing, said housing having first load connecting means on only said second of said housing elements and second load connecting means on said rod, such that working loads on the lock are primarily carried by said first of said housing elements.

2. The lock of claim 1 wherein said first of said housing elements is made of sheet stock bent to form a channel open along one side between side edges, said second of said housing elements being secured to said side edges for closing said open side.

3. The lock of claim 2 wherein said channel has a U-shaped cross-section.

4. The lock of claim 3 wherein said second of said housing elements has a planar base portion secured to said side edges such that said housing has a generally rectangular cross section.

5. The lock of claim 2 wherein said side edges have crimped portions passing through openings in said second of said housing elements for securing together said housing elements.

6. The lock of claim 1 wherein said housing elements are made of materials having substantially different characteristic strength and weight, said first housing element being made of the lighter material and said second housing element being made of the stronger material.

7. The mechanical lock of claim 1 wherein said housing elements are fastened together by mechanically interlocking with each other and without welding to each other.

8. The lock of claim 1 wherein said axial bearing means are adjustable by movement relative to both said housing elements for reducing possible axial movement of said spring between said axial bearing means.

9. The lock of claim 1 wherein said axial bearing means comprise cam means rotatably mounted on said second housing element for reducing possible axial movement of said spring between said axial bearing means.

10. The lock of claim 1 wherein said first housing element is U-shaped in cross-section and said second housing element has a substantially flat plate for bridging the open side of said cross-section.

11. The lock of claim 1 wherein said housing elements are made of materials having substantially different characteristic strength, said second housing element being made of substantially stronger material than said first housing element.

12. The lock of claim 1 wherein said second housing element is made of steel and said first housing element is made of a non-ferrous material substantially lighter than steel.

13. The lock of claim 1 wherein said second housing element is made of harder steel and said first housing element is made of softer steel.

14. A mechanical lock comprising a U-shaped channel element having an open side and a cap element mechanically retained to said channel element for closing said open side to form a tubular housing having open ends, a rod within said channel element, coil spring means on said rod, said spring means having ends circumferentially fixed to said channel element and end coils axially captive between axial bearing elements supported only by said cap element, said axial bearing means including moveable means adjustable for reducing possible axial movement of said spring between said axial bearing means, said spring means having a normal inside diameter sized for tightly gripping the rod against movement along said channel element, release means actuatable for partially unwinding end coils of said spring means, said channel element being dimensioned for closely containing the outer diameter of said spring means to transmit said unwinding along said spring means and ensure fast release of said rod for axial displacement along said channel element upon actuation of said release means.

15. The lock of claim 14 further comprising an external spring compressed between said housing and said rod for biasing said rod to an extended condition, a spring stop means integral with said channel element and said cap element bearing against one end of said spring.

16. The lock of claim 15 wherein said spring stop means comprise a spring stop on a bottom of said channel element.

17. The lock of claim 14 wherein said open side is between side edges of said channel element, a plurality of tabs along said side edges, said tabs mating into slots provided in said cap element, said tabs being bent for mechanically interlocking said channel element to said cap element.

18. The lock of claim 14 said cap element having means for mounting release actuating means.

19. The lock of claim 14 wherein said axial bearing elements comprise a fixed element integral with said cap element at one spring end and an adjustable element having said moveable means on said cap element at an opposite spring end.

20. The lock of claim 14 wherein said circumferentially fixed ends are circumferentially engaged in openings defined in said channel element.

21. A mechanical lock comprising a lock housing, a rod axially movable through said housing, said rod being locked against movement through said housing in a normal condition of said lock by coil spring means tightly wound about said rod, said spring means having end tangs circumferentially fixed to said housing, said spring means being axially captive between axial bearing means on said housing, and means for unwinding said spring means thereby to release said rod for movement through said housing, said axial bearing means extending through said housing and having an outer portion external to said housing, said axial bearing means being adjustable by movement relative to said housing for reducing spacing between said axial bearing means thereby to minimize possible axial displacement of said spring means along said rod between said axial bearing means, and means for securing said outer portion to said housing thereby to fix the spacing between said axial bearing means following adjustment.

22. The lock of claim 21 wherein said axial bearing means comprise a plug fitted into an opening in said lock housing, said plug having an inner end interior to said housing, an eccentric cam element on said inner end engageable with an end coil of said spring means, and said outer portion comprises an outer end accessible from the outside or exterior of said housing for turning said plug in said opening for removing free play of said spring means between said axial bearing means.

23. The lock of claim 22 wherein said outer end is slotted for engaging a bladed tool such as a screwdriver.

24. The lock of claim 21 wherein said means for securing comprise adhesive means applied to said axial bearing means following adjustment.

25. The lock of claim 21 wherein said axial bearing means comprise cam means rotatable on said housing for effectively changing the spacing between said axial bearing means.

26. A mechanical lock comprising a lock housing, a rod axially movable through said housing, said rod being locked against movement through said housing in a normal condition of said lock by coil spring means tightly wound about said rod, said spring means having end tangs circumferentially fixed to said housing, rotatable means including eccentric cam means engageable with an end coil of said spring means, said rotatable means being adjustable for turning said cam means thereby to urge an opposite end coil of said spring means into engagement with an opposite axial bearing element on said housing for reducing freedom of axial displacement of said spring means along said rod, and means for partially unwinding said spring means thereby to release said rod for movement through said housing.

27. The lock of claim 26 further comprising means for locking said rotatable means following adjustment.

28. A mechanical lock comprising:
a first housing element, first and second axial bearing means spaced apart on said first housing element, a rod, coil spring means wound on said rod, said spring means being axially contained between said axial bearing means, said spring means having a normal inner diameter for holding said rod against axial movement relative to said first housing element, said rod with said spring means being retained in a radial direction against separation from said first housing element and said axial bearing means by second housing means secured to said first housing element, and release means for partially unwinding said spring means and freeing said rod for axial movement relative to said first housing element, characterized in that said first housing element and said second housing means are secured to each other only by tabs of said second housing means passing through openings in said first housing element, said tabs being bent for securing together said housing element and said housing means.

29. The lock of claim 28 wherein one said axial bearing means is a bearing shoulder integral with said first housing element.

30. The lock of claim 28 wherein said spring means is radially contained only between said first housing element and said second housing means.

31. The lock of claim 28 further comprising first load connecting means on said first housing element and second load connecting means on said rod, such that said second housing means is substantially free of working loads transmitted between said load connecting means through said first housing element and said rod.

32. The lock of claim 28 wherein said axial bearing means include portions engageable externally to said housing for adjusting the effective spacing between said axial bearing means so as to closely contain said spring means against axial movement between said axial bearing means.

33. The lock of claim 28 wherein said axial bearing means comprise an axial bearing shoulder integrally formed with said first housing element and an adjustable axial bearing extending through said first housing element.

34. A mechanical lock comprising:

a first housing element having first and second axial bearing means spaced apart thereon;

a rod and coil spring means wound on said rod;

said spring means being axially contained between said axial bearing means, said spring means having a normal inner diameter for holding said rod against axial movement relative to said first housing element;

said first housing element with said axial bearing means thereon being adapted for receiving said spring means between said axial bearing means with the spring means preassembled to said rod;

a second housing element secured to said first housing element for retaining said rod with said spring means against separation from said first housing element and said axial bearing means, said first housing element and said second housing element being secured to each other only by mechanically interlocking portions;

said axial bearing means being positionable on said first housing element for adjusting the effective spacing between said axial bearing means so as to closely contain said spring means against axial movement between said axial bearing means;

first load connecting means on said first housing element and second load connecting means on said rod, said second housing means being free of said load connecting means and thus substantially free of working loads transmitted between said load connecting means through said first housing element and said rod; and release means for partially unwinding said spring means and freeing said rod for axial movement relative to said first and said second housing elements.

35. A method for making a mechanical lock comprising the steps of:

providing a first housing element having first and second axial bearing means spaced apart on said first housing element;

providing a subassembly comprising a rod with coil spring means wound on said rod and end tangs at opposite ends of said spring means, said spring means having a normal inner diameter for tightly gripping said rod against axial translation through said spring means, and release means including a release lever circumferentially rotatable about said rod for partially unwinding said spring on said rod;

assembling said subassembly to said first housing element by positioning said spring means axially between said axial bearing means for holding said rod against axial movement relative to said first housing element;

providing second housing means;

circumferentially fixing said end tangs relative to said first housing element and said second housing means;

assembling said second housing means to said first housing element for containing therebetween said subassembly; and repositioning said axial bearing means on said first housing element after said step of assembling said second housing means for adjusting the effective spacing between said axial bearing means so as to closely contain said spring means against axial movement between said axial bearing means.

36. The method of claim 35 wherein said step of assembling said second housing means to said first housing element comprises the step of mechanically interlocking portions of said first housing element and said second housing means.

37. The method of claim 35 wherein said step of circumferentially fixing comprises the step of inserting said end tangs in corresponding openings defined in said second housing means.

* * * * *